United States Patent
Honma et al.

(10) Patent No.: US 12,269,739 B2
(45) Date of Patent: Apr. 8, 2025

(54) METHOD FOR PRODUCING POSITIVE ELECTRODE ACTIVE MATERIAL FOR ALKALI ION SECONDARY BATTERIES

(71) Applicants: NIPPON ELECTRIC GLASS CO., LTD., Otsu (JP); NATIONAL UNIVERSITY CORPORATION NAGAOKA UNIVERSITY OF TECHNOLOGY, Nagaoka (JP)

(72) Inventors: Tsuyoshi Honma, Nagaoka (JP); Masafumi Hiratsuka, Nagaoka (JP); Hideo Yamauchi, Otsu (JP); Ayumu Tanaka, Otsu (JP); Kei Tsunoda, Otsu (JP); Yoshinori Yamazaki, Otsu (JP)

(73) Assignees: NIPPON ELECTRIC GLASS CO., LTD., Shiga (JP); NATIONAL UNIVERSITY CORPORATION NAGAOKA UNIVERSITY OF TECHNOLOGY, Niigata (JP)

( * ) Notice: Subject to any disclaimer, the term of this patent is extended or adjusted under 35 U.S.C. 154(b) by 0 days.

(21) Appl. No.: 18/273,283

(22) PCT Filed: Feb. 3, 2022

(86) PCT No.: PCT/JP2022/004177
§ 371 (c)(1),
(2) Date: Jul. 20, 2023

(87) PCT Pub. No.: WO2022/176627
PCT Pub. Date: Aug. 25, 2022

(65) Prior Publication Data
US 2024/0116759 A1 Apr. 11, 2024

(30) Foreign Application Priority Data
Feb. 16, 2021 (JP) .................. 2021-022506
Oct. 25, 2021 (JP) .................. 2021-173855

(51) Int. Cl.
*C01B 25/45* (2006.01)
*C01D 15/02* (2006.01)
*H01M 4/58* (2010.01)
*H01M 10/054* (2010.01)

(52) U.S. Cl.
CPC ............ *C01B 25/45* (2013.01); *C01D 15/02* (2013.01); *H01M 4/5825* (2013.01); *C01P 2002/72* (2013.01); *C01P 2004/61* (2013.01); *C01P 2006/40* (2013.01); *H01M 10/054* (2013.01)

(58) Field of Classification Search
CPC .................................................. H01M 4/139
See application file for complete search history.

(56) References Cited

U.S. PATENT DOCUMENTS

| 2012/0077083 A1 | 3/2012 | Kageura et al. |
| 2015/0303470 A1 | 10/2015 | Honma et al. |

FOREIGN PATENT DOCUMENTS

| JP | 2011-146360 A | | 7/2011 | |
| JP | 2020136211 A | * | 8/2020 | ........ H01M 10/0562 |
| WO | 2012/057340 A1 | | 5/2012 | |
| WO | 2013/133369 A1 | | 9/2013 | |

OTHER PUBLICATIONS

Official Communication issued in International Patent Application No. PCT/JP2022/004177, mailed on Apr. 19, 2022.
Barpanda et al., "Structural, magnetic and electrochemical investigation of novel binary Na2-x(Fe1-yMny)P2O7 (0 ≤y≤ 1) pyrophosphate compounds for rechargeable sodium-ion batteries", Solid State Ionics, http://dx.doi.org/10.1016/j.ssi.2014.03.011, 2014, pp. 1-7.

* cited by examiner

*Primary Examiner* — Khanh T Nguyen
(74) *Attorney, Agent, or Firm* — Keating & Bennett, LLP

(57) ABSTRACT

Provided is a method for producing a positive electrode active material for an alkali ion secondary battery, the positive electrode active material containing a large amount of a transition metal and enabling operation of the battery. In the method for producing a positive electrode active material for an alkali ion secondary battery, in which the positive electrode active material contains 34 mol % or more of CrO+FeO+MnO+CoO+NiO, the method includes: a step of preparing a positive electrode active material precursor containing crystals; and a step of irradiating the positive electrode active material precursor with light to melt the crystals and amorphize at least a portion of the positive electrode active material precursor.

6 Claims, No Drawings

METHOD FOR PRODUCING POSITIVE ELECTRODE ACTIVE MATERIAL FOR ALKALI ION SECONDARY BATTERIES

TECHNICAL FIELD

The present invention relates to a method for producing a positive electrode active material used as an electrode material for an alkali ion secondary battery such as a sodium ion secondary battery.

BACKGROUND ART

In recent years, in addition to polyanion-based materials, layered rock salt-based oxides and other such materials have been examined for positive electrode active materials for alkali ion secondary batteries such as a sodium ion secondary battery (for example, see Non-Patent Document 1). Improving the capacity of a material is important for achieving high energy density in a battery. For example, a maricite-type $NaFePO_4$ crystal is known to have a relatively high theoretical capacitance (approximately 155 mAh/g) due to a high proportion of transition metal element in the crystal.

CITATION LIST

Non-Patent Document

Non-Patent Document 1: Prabeer Barpanda et al., Solid State Ionics, 2014 (DOI: 10.1016/j.ssi.2014.03.011)

SUMMARY OF INVENTION

Technical Problem

However, since a maricite-type crystal does not have a diffusion path for a Na ion and is electrochemically inactive, such a crystal does not function as a positive electrode active material and is unable to cause a battery to operate.

The present invention has been developed in view of the circumstances above, and an object of the present invention is to provide a method for producing a positive electrode active material for an alkali ion secondary battery, the positive electrode active material containing a large amount of a transition metal and enabling operation of the battery.

Solution to Problem

According to the present invention, provided is method for producing a positive electrode active material for an alkali ion secondary battery, the positive electrode active material containing, in terms of mol %, 34% or more of $CrO+FeO+MnO+CoO+NiO$, and the method including: a step of preparing a positive electrode active material precursor containing crystals; and a step of irradiating the positive electrode active material precursor with light to melt the crystals and amorphize at least a portion of the positive electrode active material precursor. As described above, when the positive electrode active material precursor containing crystals is irradiated with light and melted, the crystal structure collapses and becomes amorphous, and therefore an interatomic distance in the positive electrode active material increases, and a three-dimensional conduction path of alkali ions can be formed. As a result, the material functions as a positive electrode active material and can cause a battery to operate. Note that a material containing a large amount of a transition metal element component as described above is not easily vitrified by an ordinary melting method using a melting vessel. However, with the production method of the present invention, a positive electrode active material precursor containing crystals is used as a raw material, and the positive electrode active material precursor is melted by irradiation with light, and therefore even a material containing a large amount of a transition metal element component can be easily amorphized.

Note that "x+y+ . . . " as used herein refers to a total amount of the components. Here, each component is not necessarily required to be contained as an essential component, and there may be a component that is not contained (that is, the content is 0%).

In the method for producing a positive electrode active material for an alkali ion secondary battery of the present invention, the positive electrode active material for an alkali ion secondary battery preferably contains, in terms of mol % of the following oxides, from 20 to 55% of $Li_2O+Na_2O$, from 34 to 70% of $CrO+FeO+MnO+CoO+NiO$, and from 5 to 55% of $P_2O_5+SiO_2+B_2O_3$.

In the method for producing a positive electrode active material for an alkali ion secondary battery of the present invention, the positive electrode active material for an alkali ion secondary battery preferably further contains, in terms of mol % of an external division ratio, from 40 to 60% of LiF+NaF.

In the method for producing a positive electrode active material for an alkali ion secondary battery of the present invention, the crystals are preferably maricite-type crystals. Maricite-type crystals are preferable because the proportion of the transition metal element in the crystal is high and a positive electrode active material having a high discharge capacity can be obtained.

In the method for producing a positive electrode active material for an alkali ion secondary battery of the present invention, the light preferably has a peak wavelength of from 0.1 to 30 µm. When the light at such a wavelength is used, the positive electrode active material precursor containing crystals can be easily made amorphous.

In the method for producing a positive electrode active material for an alkali ion secondary battery of the present invention, a light source that emits the light is preferably at least one type selected from a near-infrared heater, a far-infrared heater, a halogen lamp, a $CO_2$ laser, a YAG laser, a Yb:$YVO_4$ laser, a laser diode, and a xenon lamp.

In the method for producing a positive electrode active material for an alkali ion secondary battery of the present invention, a layer containing the positive electrode active material for an alkali ion secondary battery may be formed on a solid electrolyte layer by irradiating the positive electrode active material precursor with light in a state in which the positive electrode active material precursor is disposed on the solid electrolyte layer.

The method for producing a positive electrode active material for an alkali ion secondary battery of the present invention may include, after the step of amorphizing at least a portion of the positive electrode active material precursor to obtain an amorphous phase, crystallizing at least a portion of the amorphous phase by subjecting to a heat treatment.

Advantageous Effects of Invention

According to the present invention, a positive electrode active material for an alkali ion secondary battery can be produced with the positive electrode active material containing a large amount of a transition metal and enabling operation of the battery.

DESCRIPTION OF EMBODIMENTS (Positive Electrode Active Material for Alkali Ion Secondary Battery)

First, the positive electrode active material for an alkali ion secondary battery (hereinafter, also simply referred to as the "positive electrode active material") produced by the method of the present invention will be described. In the following description pertaining to the content of each component, "%" means "mol %" unless otherwise indicated.

The positive electrode active material for an alkali ion secondary battery produced by the production method of the present invention contains, as an essential component, at least one type selected from CrO, FeO, MnO, CoO, and NiO. CrO, FeO, MnO, CoO and NiO, which are transition metal oxides, have a role of increasing an oxidation-reduction potential of the positive electrode active material by changing the valence during charging and discharging. Among these components, MnO and NiO are highly effective in increasing the oxidation-reduction potential. In addition to the effect described above, FeO also has an effect of stabilizing a structure of the positive electrode active material during charging and discharging and of improving cycle characteristics. Therefore, preferably, the transition metal oxide is appropriately selected according to the desired characteristics, and in some cases, transition metal oxides are preferably mixed and used.

Note that Cr, Fe, Mn, Co and Ni preferably have a low valence, particularly a valence of 2. When alkali ions are released from the positive electrode active material in association with initial charging, an oxidation reaction of transition metal ions (for example, $Fe^{2+} \to Fe^{3+}$) proceeds as charge compensation. As a proportion of low-valence (particularly divalent) transition metal ions that contribute to charge compensation increases, an amount of alkali ions released from the positive electrode active material also increases, and a high charge-discharge capacity is likely to be exhibited.

The content of CrO+FeO+MnO+CoO+NiO is preferably 34% or greater, 35% or greater, 40% or greater, or 45% or greater, and is particularly preferably 48% or greater. When the content of CrO+FeO+MnO+CoO+NiO is too small, the amount of transition metal elements that cause an oxidation-reduction reaction decreases, resulting in a decrease in the amount of alkali ions involved in absorption and release, and therefore the charge-discharge capacity tends to decrease. On the other hand, when the content of CrO+FeO+MnO+CoO+NiO is too large, formation of an amorphous material becomes difficult, and the discharge capacity tends to decrease. Thus, the content of CrO+FeO+MnO+CoO+NiO is preferably 70% or less, 60% or less, or 55% or less, and is particularly preferably 53% or less. Note that when any two or more types of CrO, FeO, MnO, CoO and NiO are contained, total amount thereof preferably satisfies the above range.

A content of each component of CrO, FeO, MnO, CoO, and NiO is preferably 0% or more, 10% or more, 20% or more, 30% or more, 34% or more, 35% or more, 40% or more, or 45% or more, and particularly preferably 48% or more, and is preferably 70% or less, 60% or less, or 55% or less, and particularly preferably 53% or less. In the present invention, the content of transition metal oxides other than divalent transition metal oxides (for example, $Cr_2O_3$, $Fe_2O_3$, $MnO_2$, etc.) is expressed in terms of divalent transition metal oxides.

$Li_2O$ and $Na_2O$ serve as supply sources of alkali ions that move between the positive electrode active material and a negative electrode active material during charging and discharging. A content of $Li_2O+Na_2O$ is preferably 20% or more, or 23% or more, and particularly preferably 25% or more, and is preferably 55% or less, 40% or less, 32% or less, or 29% or less, and particularly preferably 27% or less. When the content of $Li_2O+Na_2O$ is too small, the amount of alkali ions involved in absorption and release decreases, and thus the charge-discharge capacity tends to decrease. On the other hand, when the content of $Li_2O+Na_2O$ is too large, other crystals that are not involved in charging and discharging, such as $Li_3PO_4$ and $Na_3PO_4$, are likely to be formed, and therefore the charge-discharge capacity tends to decrease. When the positive electrode active material for an alkali ion secondary battery of the present invention is used as a positive electrode active material for a sodium-ion secondary battery, the positive electrode active material preferably contains $Na_2O$ as an alkali metal oxide in the range described above. When the positive electrode active material for an alkali ion secondary battery of the present invention is used as a positive electrode active material for a lithium-ion secondary battery, the positive electrode active material preferably contains $Li_2O$ as an alkali metal oxide in the range described above.

$P_2O_5$, $SiO_2$, and $B_2O_3$ are components that form a three-dimensional network structure and stabilize the structure of the positive electrode active material. When these components are contained, an amorphous phase is easily formed, and alkali ion conductivity tends to improve. In particular, $P_2O_5$ exhibits excellent alkali ion conductivity and thus is preferable. A content of $P_2O_5+SiO_2+B_2O_3$ is preferably 5% or more, 10% or more, or 20% or more, and particularly preferably 23% or more, and is preferably 55% or less, 40% or less, 35% or less, or 30% or less, and particularly preferably 26% or less. When the content of $P_2O_5+SiO_2+B_2O_3$ is too small, the effect described above is not easily obtained. On the other hand, when the content of $P_2O_5+SiO_2+B_2O_3$ is too large, other crystals such as $P_2O_5$ that are not involved in charging and discharging are likely to be formed, and therefore the charge-discharge capacity tends to decrease. When any two types of $P_2O_5$, $SiO_2$, and $B_2O_3$ are contained, the total amount thereof preferably satisfies the range described above.

The content of each of the $P_2O_5$, $SiO_2$, and $B_2O_3$ components is preferably 0% or more, 5% or more, 10% or more, or 20% or more, and particularly preferably 23% or more, and preferably 55% or less, 40% or less, 35% or less, or 30% or less, and particularly preferably 26% or less.

LiF and NaF function as a flux that promotes amorphization, and also serve as a supply source of alkali ions that move between the positive electrode active material and the negative electrode active material during charging and discharging. A fluoride ion has a smaller ion radius than that of an oxide ion, and therefore inclusion of the LiF and NaF components facilitates an improvement in the alkali ion diffusivity inside the positive electrode active material.

In terms of mol % of an external division ratio (specifically, an external division ratio with respect to a total amount of the oxide components), the total amount of LiF and NaF is preferably from 40 to 60%, or from 45 to 55%, and is particularly preferably from 47.5 to 52.5%. When the total amount of LiF and NaF is too large, the amount of alkali ions not involved in charging and discharging increases, and thus the charge-discharge capacity tends to decrease. On the other hand, when the total amount of LiF and NaF is too small, rapid charging and discharging characteristics tend to decrease. Both LiF and NaF may be contained, or only one may be contained.

In terms of mass %, the content of the amorphous phase in the positive electrode active material is preferably 50% or more, 70% or more, 80% or more, 85% or more, or 95% or more, and is particularly preferably 100%. When the content of the amorphous phase is too small, the alkali ion conductivity tends to decrease, and the charge-discharge characteristics (particularly, high-speed charge-discharge characteristics) and the cycle characteristics tend to decrease.

The content of the amorphous phase in the positive electrode active material is determined by powder X-ray diffraction measurements using CuKu ray, and a diffraction line profile of a 2θ value from 10 to 60° is subjected to peak separation to separate a crystalline diffraction line and an amorphous halo. Specifically, from the total scattering curve obtained by subtracting the background from the diffraction line profile, the integrated intensity, denoted by Ia, is determined by peak separating a broad diffraction line (amorphous halo) at 10 to 45°, and the sum of integrated intensities, denoted by Ic, is determined by peak separation of crystalline diffraction lines originating from crystals and detected at 10 to 60°. The content Xg of the amorphous phase is obtained from the following equation.

$$Xg=[1-\{Ic/(Ic+Ia)\}]\times 100 \text{(mass \%)}$$

The form of the positive electrode active material is not particularly limited, but is preferably a powder form. When the positive electrode active material is in the form of powder, the specific surface area increases, and the number of sites for absorbing and releasing alkali ions increases, and therefore the charge-discharge capacity is easily improved. An average particle size of the positive electrode active material is preferably from 0.1 to 20 µm, from 0.3 to 15 µm, or from 0.5 to 10 µm, and is particularly preferably from 0.6 to 5 µm. In addition, the maximum particle size of the positive electrode active material is preferably 150 µm or less, 100 µm or less, or 75 µm or less, and is particularly preferably 55 µm or less. When the average particle size or the maximum particle size is too large, it becomes difficult to absorb and release alkali ions when charging and discharging, and therefore the charge-discharge capacity tends to decrease. On the other hand, if the average particle size is too small, the dispersion of the powder tends to become poor when the powder is formed into a paste, and producing a uniform electrode tends to be difficult.

Here, the average particle size and the maximum particle size refer to the D50 (50% volume-cumulative size), which is the median size of the primary particles, and the D99 (99% volume-cumulative size), respectively, and refer to values measured using a laser diffraction particle size analyzer.

(Method for Producing Positive Electrode Active Material for Alkali Ion Secondary Battery)

Next, the method for producing the positive electrode active material for an alkali ion secondary battery of the present invention will be described in detail.

First, a positive electrode active material precursor containing crystals is prepared. For example, the positive electrode active material precursor can be obtained by firing and reacting (solid-phase reaction) raw materials compounded, to produce a positive electrode active material having a desired composition. The composition of the positive electrode active material precursor is the same as that of the positive electrode active material for an alkali ion secondary battery described above, and thus the description of the composition is omitted. Examples of the crystal contained in the positive electrode active material precursor include a maricite-type crystal ($NaMPO_4$; where M is at least one type selected from Cr, Fe, Mn, Co, and Ni). Maricite-type crystals are preferable because the proportion of the transition metal element in the crystal is high and a positive electrode active material having a high discharge capacity can be obtained.

The positive electrode active material precursor may be composed of only crystals (that is, the crystal content is 100%), or may partially contain an amorphous phase. In addition, the positive electrode active material precursor may be a bulk body, or may be, for example, in the form of a powder obtained by pulverization.

For the positive electrode active material contains LiF or NaF, examples of the positive electrode active material precursor include $Li_2MPO_4F$ crystals and $Na_2MPO_4F$ crystals. Alternatively, a mixture of $LiMPO_4$ crystals and LiP or a mixture of $NaMPO_4$ crystals and NaF may be used as the positive electrode active material precursor. In particular, it is preferable to use $Li_2MPO_4F$ crystals or $Na_2MPO_4F$ crystals as the positive electrode active material precursor because a homogeneous positive electrode active material can be easily obtained. In the $Li_2MPO_4F$ crystal, $Na_2MPO_4F$ crystal, $LiMPO_4$ crystal, and $NaMPO_4$ crystal, M is at least one type selected from Cr, Fe, Mn, Co, and Ni.

Next, the positive electrode active material precursor is irradiated with light. Through this irradiation, the crystals are melted and then rapidly cooled to become amorphous. As a result, a positive electrode active material for an alkali ion secondary battery can be obtained with the positive electrode active material having an amorphous phase. Note that all of the crystals may be made amorphous or a portion of the crystals may be made amorphous.

A peak wavelength of the light that is used for irradiation is preferably 0.1 µm or greater, 0.3 µm or greater, or 0.5 µm or greater, and particularly preferably 0.9 µm or greater, and is preferably 30 µm or less, 20 µm or less, 10 µm or less, or 5 µm or less, and particularly preferably 3 µm or less. When the peak wavelength is set as such, an energy density of the light is likely to increase, and the positive electrode active material precursor can be amorphized by irradiation for a shorter amount of time.

Examples of the light source used for light irradiation include a near-infrared heater, a far-infrared heater, a halogen lamp, a $CO_2$ laser, a YAG laser, a Yb:$YVO_4$ laser, a laser diode, and a xenon lamp. Among these, a halogen lamp capable of irradiation over a wide area is preferably used. Among these light sources, a single type may be used alone, or a combination of two or more types thereof may be used.

The light irradiation time may be appropriately selected such that the crystals in the positive electrode active material precursor are sufficiently melted and amorphized. For example, the light irradiation time is preferably 1 second or longer, or 3 seconds or longer, and particularly preferably 5 seconds or longer. The upper limit of the light irradiation time is not particularly limited, but problems may occur if the light irradiation time is too long, such as the alkali component or the like evaporating, resulting in the inability to obtain the positive electrode active material having the desired composition. Thus, the upper limit thereof is preferably 1000 seconds or less, 500 seconds or less, or 200 seconds or less, and particularly preferably 100 seconds or less. Note that in particular, when the light source is a laser, the irradiated portion tends to be localized, and therefore irradiation is preferably carried out while scanning the laser as necessary.

Preferably, a conductive carbon is mixed with the positive electrode active material precursor, and then the mixture is irradiated with light. Conductive carbon has a light absorption property, and therefore when the positive electrode active material precursor is irradiated with light, the positive electrode active material precursor can be efficiently amorphized in a short amount of time. In addition, when a conductive carbon is mixed with the positive electrode active material precursor, a positive electrode active material that is complexed with the conductive carbon is formed, and therefore electrical conductivity can be imparted to the positive electrode active material, and the discharge capacity and the high-speed charging and discharging characteristics can be enhanced. In addition, the conductive carbon has a reducing property, and therefore, when the mixture is irradiated with light, oxidation (valence change) of the transition metal element contained in the positive electrode active material precursor can be suppressed. Thus, a positive electrode active material having a high charge-discharge capacity and good cycle characteristics can be easily obtained. As the conductive carbon, a highly conductive carbon black such as acetylene black or ketjen black; a carbon powder such as graphite; carbon fibers, or the like can be used. Among these, acetylene black having high conductivity is preferable.

Instead of the conductive carbon, an organic compound that is a conductive carbon source may be mixed with the positive electrode active material precursor, and the mixture may then be irradiated with light. In this manner, the organic compound is carbonized through irradiation with light, and a positive electrode active material complexed with conductive carbon can be obtained. As the organic compound, any raw material may be used as long as the material is an organic compound that remains as carbon in the process of light irradiation (heat treatment), but glucose, citric acid, ascorbic acid, a phenolic resin, a surfactant, and the like are preferable, and a surfactant that is easily adsorbed to the surface of the positive electrode active material is particularly preferable. The surfactant may be any of a cationic surfactant, an anionic surfactant, an amphoteric surfactant, and a nonionic surfactant, but is particularly preferably a nonionic surfactant having excellent adsorption to the surface of the positive electrode active material. Examples of the nonionic surfactant include polyethylene oxide nonylphenyl ether.

In the positive electrode active material complexed with the conductive carbon, a mass ratio of the positive electrode active material to the conductive carbon is preferably from 80:20 to 99.5:0.5, and more preferably from 85:15 to 98:2. If the content of the conductive carbon is too small, the conductivity tends to be inferior. On the other hand, when the content of the conductive carbon is too large, the content of the positive electrode active material is relatively small, and thus the discharge capacity tends to decrease.

Note that after at least a portion of the positive electrode active material precursor has been amorphized to form an amorphous phase, at least a portion of the amorphous phase may be crystallized through a heat treatment. This technique is effective in a case of a composition having a function as an active material after crystallization. Examples of such a crystal composition include $Na_4Ni_3(PO_4)_2(P_2O_7)$ and $Na_4Ni_5(PO_4)_2(P_2O_7)_2$. A heat treatment temperature may be appropriately selected at a temperature equal to or higher than a temperature at which crystallization begins, and is preferably, for example, 400° C. or higher, or 450° C. or higher, and particularly preferably 500° C. or higher. The upper limit of the heat treatment temperature is not particularly limited, but if the temperature is too high, the alkali component or the like serving as the positive electrode active material component may evaporate and the discharge capacity may decrease, and therefore the upper limit is preferably 800° C. or lower, or 700° C. or lower, and particularly preferably 600° C. or lower.

The positive electrode active material produced by the method of the present invention can be used in an alkali ion secondary battery (a sodium ion secondary battery or a lithium ion secondary battery) in which an electrolytic solution such as an aqueous solvent, a nonaqueous solvent, or an ionic liquid is used. In addition, the positive electrode active material can also be used in an all-solid-state alkali ion secondary battery (all-solid-state sodium ion secondary battery or all-solid-state lithium ion secondary battery) in which a solid electrolyte is used.

As the solid electrolyte, for example, a sodium ion conductive oxide can be used. Examples of the sodium ion conductive oxide include compounds containing at least one type selected from Al, Y, Zr, Si, and P, Na, and O. Specific examples thereof include β-alumina, β"-alumina, and NASICON-type crystals. Preferably, the sodium ion conductive oxide is β-alumina or β"-alumina. β-alumina or δ"-alumina are more excellent in sodium ion conductivity.

When the solid electrolyte is β-alumina or β"-alumina, the solid electrolyte may contain, for example, in terms of mol %, from 65% to 98% of $Al_2O_3$, from 2% to 20% of $Na_2O$ %, and from 0.3% to 15% of $MgO+Li_2O$.

The solid electrolyte preferably contains $ZrO_2$ or $Y_2O_3$ in addition to the components described above. $ZrO_2$ and $Y_2O_3$ have an effect of suppressing abnormal grain growth of 1-alumina and/or β"-alumina in preparation of a solid electrolyte by firing a raw material, and of further improving adhesion of β-alumina and/or δ"-alumina particles. The $ZrO_2$ content is preferably from 0% to 15%, more preferably from 1% to 13%, and even more preferably from 2% to 10%. The $Y_2O_3$ content is preferably from 0% to 5%, more preferably from 0.01% to 4%, and even more preferably from 0.02% to 3%. If the content of $ZrO_2$ or $Y_2O_3$ is too large, the amount of β-alumina and/or β"-alumina produced decreases, and the sodium ion conductivity tends to decrease.

In a case in which the solid electrolyte is a NASICON-type crystal, examples of the crystal include those represented by general formula $Na_sAl_tA2_uO_v$ (wherein A1 is at least one type selected from Al, Y, Yb, Nd, Nb, Ti, Hf, and Zr, A2 is at least one type selected from Si and P, s=1.4 to 5.2, t=1 to 2.9, u=2.8 to 4.1, and v=9 to 14). In a preferred embodiment of the crystal, A1 is at least one type selected from Y, Nb, Ti, and Zr, s=2.5 to 3.5, t=1 to 2.5, u=2.8 to 4, and v=9.5 to 12. In this case, a crystal having more excellent sodium ion conductivity can be formed. In particular, if the solid electrolyte is a monoclinic or trigonal NASICON-type crystal, the sodium ion conductivity is even more excellent, and thus such a solid electrolyte is preferable.

Specific examples of crystals represented by general formula $Na_sAl_tA2_uO_v$ described above include $Na_3Zr_2Si_2PO_{12}$, $Na_{3.2}Zr_{1.3}Si_{2.2}P_{0.8}O_{10.5}$, $Na_3Zr_{1.6}Ti_{0.4}Si_2PO_{12}$, $Na_3Hf_2Si_2PO_{12}$, $Na_{3.4}Zr_{0.9}Hf_{1.4}Al_{0.6}Si_{1.2}P_{1.8}O_{12}$, $Na_3Zr_{1.7}Nb_{0.24}Si_2PO_{12}$, $Na_{3.6}Ti_{0.2}Y_{0.8}Si_2O_9$, $Na_3Zr_{1.88}Y_{0.12}Si_2PO_{12}$, $Na_{3.12}Zr_{1.88}Y_{0.12}Si_2PO_{12}$, and $Na_{3.6}Zr_{0.13}Yb_{1.67}Si_{0.11}P_{2.9}O_{12}$.

A layer (positive electrode layer) containing a positive electrode active material may be formed on a solid electrolyte layer by irradiating the positive electrode active material precursor with light in a state in which the positive electrode active material precursor described above is disposed on the surface of the solid electrolyte layer. In this manner, the positive electrode active material precursor is amorphized and fused to the solid electrolyte layer by irradiation with light, and thereby a conduction path of alkali ions can be formed.

Further, after the positive electrode layer containing the positive electrode active material is formed on the solid electrolyte through irradiation with light, a heat treatment may be carried out to crystallize the positive electrode active material. The heat treatment temperature may be appropriately selected to be equal to or higher than a temperature at which crystallization begins, and is preferably, for example, 400° C. or higher, or 450° C. or higher, and particularly preferably 500° C. or higher. The upper limit of the heat treatment temperature is not particularly limited, but if the heat treatment temperature is too high, the alkali component or the like serving as the positive electrode active material component may evaporate and the discharge capacity may decrease. In addition, the positive electrode active material and the solid electrolyte react with each other, and other crystals are formed at the interface therebetween, and therefore the internal resistance of the battery may increase. Accordingly, the heat treatment temperature is preferably 800° C. or lower, or 700° C. or lower, and particularly preferably 600° C. or lower.

EXAMPLES

Hereinafter, the present invention will be described in detail on the basis of examples, but the present invention is not limited to these examples.

(I) Liquid Sodium Ion Secondary Battery

Table 1 presents Examples (Nos. 1 to 4) and Comparative Examples (Nos. 5 and 6) in which the method for producing a positive electrode active material for an alkali ion secondary battery according to the present invention is applied to a liquid sodium ion secondary battery.

Each positive electrode active material precursor was pulverized and classified to produce a positive electrode active material precursor powder having an average particle size of 0.8 μm.

(2) Production of Positive Electrode Active Material Powder

A positive electrode active material powder of Example No. 1 was prepared as follows. The positive electrode active material precursor powder was deposited on a Si substrate and irradiated from above with a continuous oscillation-type Yb:YVO$_4$ laser which was scanned during irradiation (output of 0.35 W, laser size of 40 μm, peak wavelength of 1080 nm, and scanning speed of 1 mm/s). As a result, the positive electrode active material precursor powder was amorphized. The obtained sample was pulverized, and a positive electrode active material powder having an average particle size of 2.5 μm was obtained.

A positive electrode active material powder of Example No. 2 was prepared as follows. Namely, 21 parts by mass (12 parts by mass in terms of carbon) of the nonionic surfactant polyethylene oxide nonylphenyl ether (mass average molecular weight: 660) as a carbon source, and 10 parts by mass of ethanol were thoroughly mixed in 100 parts by mass of the positive electrode active material precursor powder, after which the mixture was dried at 100° C. for approximately 1 hour. The obtained mixture was irradiated in a vacuum with near infrared light (output of 200 W, irradiation time of 60 seconds) using a halogen lamp, and carbonization of the nonionic surfactant and amorphization of the positive electrode active material precursor powder were simultaneously carried out. The obtained sample was pulverized, and a positive electrode active material powder having an average particle size of 2.5 μm and a surface coated with carbon was obtained.

Positive electrode active material powders of Example Nos. 3 and 4 were prepared in the following manner. Namely, 1 part by mass of acetylene black as a conductive aid and 30 parts by mass of ethanol were thoroughly mixed

TABLE 1

|  |  | No. 1 | No. 2 | No. 3 | No. 4 | No. 5 | No. 6 |
|---|---|---|---|---|---|---|---|
| Composition (mol %) | Na$_2$O | 25 | 25 | 25 | 25 | 25 | 25 |
|  | FeO | 50 | 50 | 50 |  | 50 |  |
|  | MnO |  |  |  | 50 |  | 50 |
|  | P$_2$O$_5$ | 25 | 25 | 25 | 25 | 25 | 25 |
| Light source |  | Yb:YVO$_4$ laser | Halogen lamp | Halogen lamp | Halogen lamp | — | — |
| Carbon source |  | — | Polyethylene oxide nonylphenyl ether | Acetylene black | Acetylene black | — | — |
| Amorphous content (mass %) |  | 80 | 92 | 100 | 100 | 0 | 0 |
| Discharge capacity (mAh/g) |  | 48 | 71 | 87 | 102 | Non-operating | Non-operating |

(1) Raw Material Preparation

Various oxide raw materials, carbonate raw materials, and phosphate raw materials were weighed to prepare batches to have the compositions described in Table 1. The obtained batches were each fired in nitrogen at 1200° C. and underwent the reaction, and thus the positive electrode active material precursors were prepared. The crystal structure of each positive electrode active material precursor was examined using a powder X-ray diffractometer (XRD), and as a result, it was confirmed that maricite-type NaFePO$_4$ crystals were synthesized in Example Nos. 1 to 3, and a maricite-type NaMnPO$_4$ crystal was synthesized in Example No. 4.

in 100 parts by mass of the positive electrode active material precursor powder, after which the mixture was dried at 100° C. for approximately 1 hour. The obtained mixture was irradiated in a vacuum with near infrared light (output of 800 W, irradiation time of 10 seconds) using a halogen lamp, and the positive electrode active material precursor powder was amorphized. The obtained sample was pulverized, and a positive electrode active material powder having an average particle size of 2.5 μm and containing conductive carbon dispersed therein was obtained.

Each of the obtained positive electrode active material powders was analyzed by XRD, and the results indicated that the peak intensity of the diffraction pattern of each of the maricite-type crystals was significantly reduced. It is thought that melting of the crystals by the irradiation with light and subsequent rapid cooling suppressed recrystallization and facilitated amorphization of the crystals. The amorphous content was calculated from the obtained XRD chart. The results are shown in Table 1.

Note that in Comparative Example Nos. 5 and 6, the positive electrode active material precursor powders obtained in Example Nos. 1 and 4, respectively, were used as is as the positive electrode active material.

(3) Production of Positive Electrode

Acetylene black (Super C65 available from Timcal Ltd.) as a conductive aid and polyvinylidene fluoride as a binder were weighed and mixed with the positive electrode active material powder obtained above such that the ratio of the (positive electrode active material powder):(conductive aid):binder to be 90:5:5 (mass ratio). The mixture was dispersed in N-methylpyrrolidone (NMP), and then thoroughly stirred using a planetary centrifugal mixer to form a slurry, and thus a positive electrode material was obtained.

A doctor blade having a gap of 125 μm was used to coat the obtained positive electrode material onto an aluminum foil having a thickness of 20 μm and serving as a positive electrode current collector, and the coated aluminum foil was vacuum dried in a dryer at 70° C., and then pressed between a pair of rotating rollers to produce an electrode sheet. The electrode sheet was punched to a diameter of 11 mm using an electrode punching machine and then dried at 150° C. for 8 hours under reduced pressure to produce a circular positive electrode.

(4) Production of Test Battery

The positive electrode obtained above was placed on a lower lid of a coin cell with the aluminum foil surface facing downward, and a 16 mm size polypropylene porous membrane dried under reduced pressure at 70° C. for 8 hours, metallic sodium as a counter electrode, and an upper lid of the coin cell were stacked thereon to prepare a test battery. As an electrolytic solution, 1M $NaPF_6$/EC:DEC=1:1 (EC=ethylene carbonate, DEC=diethyl carbonate) was used. The test battery was assembled in an environment having a dew point temperature of −70° C. or lower.

(5) Charge/Discharge Test

The test battery prepared above was charged in constant current (CC) mode at 30° C. from an open circuit voltage to 4V and then CC discharged from 4V to 2V, and the amount of electricity (initial discharge capacity) discharged from the positive electrode active material per unit mass was determined. The C-rate was set to 0.1 C. The results are shown in Table 1.

As shown in Table 1, in Example Nos. 1 to 4, the discharge capacities were from 48 to 102 mAh/g. On the other hand, in Comparative Examples Nos. 5 and 6, the batteries did not operate.

(II) All-Solid-State Sodium Ion Secondary Battery (Containing FeO as Composition of Positive Electrode Active Material)

Table 2 presents Example (No. 7) and Comparative Example (No. 8) in which the method for producing a positive electrode active material for an alkali ion secondary battery according to the present invention was applied to an all-solid-state sodium ion secondary battery.

TABLE 2

|  |  | No. 7 | No. 8 |
|---|---|---|---|
| Composition (mol %) | $Na_2O$ | 25 | 25 |
|  | FeO | 50 | 50 |
|  | MnO |  |  |
|  | $P_2O_5$ | 25 | 25 |
|  | NaF (external division ratio) | 50 | 50 |
| Light source |  | Yb:$YVO_4$ laser | — |
| Carbon source |  | Acetylene black | — |
| Amorphous content (mass %) |  | 30 | 0 |
| Discharge capacity (mAh/g) |  | 96 | Non-operating |

(1) Raw Material Preparation $NaH_2PO_4$ (available from Nacalai Tesque, Inc.), FeO (available from Kojundo Chemical Laboratory Co., Ltd.), and NaF (available from Junsei Chemical Co., Ltd.) were weighed as raw materials to prepare the compositions shown in Table 2, and respective batches were prepared. Each obtained batch was wet mixed in ethanol using a planetary ball mill at 700 rpm for 2 hours. After drying, each batch was fired at 600° C. in a $H_2/N_2$ atmosphere, and respective positive electrode active material precursors were produced. The crystal structures of the positive electrode active material precursors were examined by XRD, and the results confirmed that $Na_2FePO_4F$ crystals were synthesized. Subsequently, each positive electrode active material precursor was pulverized and classified to obtain a positive electrode active material precursor powder having an average particle size of 0.8 μm.

(2) Production of Positive Electrode

The positive electrode active material precursor powder obtained above, a NASICON crystalline solid electrolyte powder ($Na_3Zr_2PSi_2O_{12}$, average particle size of 2 μm) obtained by pulverizing with a ball mill and subjecting to air classification, and acetylene black as a conductive aid were mixed at a mass ratio of 71:25:4, and a positive electrode mixture was obtained. Polypropylene carbonate was added as a binder to the obtained positive electrode mixture at an amount of 10 mass % in terms of the external division ratio, and N-methylpyrrolidone was then further added as a solvent to have a solid content concentration of 60 mass %. The obtained mixture was kneaded using a planetary centrifugal mixer, and a positive electrode mixture paste was produced.

The positive electrode mixture paste was applied at a thickness of 150 μm onto a solid electrolyte substrate made of a NASICON crystal ($Na_3Zr_2PSi_2O_{12}$), and then vacuum dried at 300° C. to form a positive electrode mixture layer. In Example No. 7, the positive electrode mixture layer was irradiated with a continuous oscillation-type Yb:$YVO_4$ laser which was scanned during irradiation (output: 0.35 W, laser size: 90 μm, peak wavelength: 1080 nm, scanning speed: 1 mm/s). As a result, the positive electrode active material precursor powder in the positive electrode mixture was amorphized and formed a positive electrode active material. At this time, the positive electrode mixture materials were fusion-bonded, and the positive electrode mixture layer and the solid electrolyte substrate were fusion-bonded. On the other hand, Comparative Example No. 8 was fired at 550° C. for 1 hour in an $N_2$ atmosphere instead of being irradiated with a laser.

Each of the obtained positive electrode mixture layers was analyzed by XRD, and the results indicated that the peak intensity of the diffraction pattern of the $Na_2FePO_4F$ crystal of Example No. 7 was reduced. It is thought that melting of the crystals by the irradiation with light and subsequent rapid cooling suppressed recrystallization and facilitated amorphization of the crystals. The amorphous content was calculated from the obtained XRD chart. The results are shown in Table 2.

(3) Production of Test Battery

A metal aluminum thin film serving as a current collector was formed on the surface of the positive electrode mixture layer by sputtering. Metallic sodium was affixed to a surface of the solid electrolyte layer, the surface being of a side opposite the surface on which the positive electrode mixture layer was formed, and the solid electrolyte layer was then housed in a coin cell, and thereby a CR2032-type coin cell was produced.

(4) Charge/Discharge Test

The obtained test battery was charged in constant current (CC) mode at 80° C. from an open circuit voltage to 5V and then CC discharged from 5V to 2V, and the amount of electricity (initial discharge capacity) discharged from the positive electrode active material per unit mass was determined. The C-rate was set to 0.02 C.

As shown in Table 2, in Example No. 7, the discharge capacity was 96 mAh/g. On the other hand, in Comparative Example No. 8, the battery did not operate.

(III) All-Solid-State Sodium Ion Secondary Battery (Containing NiO as Composition of Positive Electrode Active Material)

Table 3 presents Examples (Nos. 9 to 13) and a Comparative Example (No. 14) in which the method for producing a positive electrode active material for an alkali ion secondary battery according to the present invention was applied to an all-solid-state sodium ion secondary battery.

(2) Production of Positive Electrode

The positive electrode active material precursor powder obtained above, a β"-alumina crystal solid electrolyte powder ($Na_{1.6}Li_{0.34}Al_{10.66}O_{17}$, average particle size of 2 μm) obtained by pulverizing with a ball mill and subjecting to air classification, and acetylene black as a conductive aid were mixed at a mass ratio of 71:25:4, and a positive electrode mixture was obtained. Polypropylene carbonate was added as a binder to the obtained positive electrode mixture at an amount of 10 mass % in terms of the external division ratio, and N-methylpyrrolidone was then further added as a solvent to have a solid content concentration of 60 mass %. The obtained mixture was kneaded using a planetary centrifugal mixer, and thereby a positive electrode mixture paste was produced.

The positive electrode mixture paste was applied at a thickness of 150 μm onto a β"-alumina solid electrolyte substrate having a thickness of 100 μm and represented by the compositional formula $Na_{1.6}Li_{0.34}Al_{10.66}O_{17}$, and then vacuum dried at 300° C. to form a positive electrode mixture layer. In Example Nos. 9 to 13, the positive electrode mixture layer was irradiated with a continuous oscillation-type Yb:$YVO_4$ laser which was scanned during irradiation (output: 0.9 W, peak wavelength: 1080 nm, scanning speed: 5 mm/s). As a result, the positive electrode active material precursor powder in the positive electrode mixture was amorphized and formed a positive electrode active material. At this time, the positive electrode mixture material was fusion-bonded in addition to fusion bonding of the positive electrode mixture layer (positive electrode layer) and the solid electrolyte substrate.

TABLE 3

| | | No. 9 | No. 10 | No. 11 | No. 12 | No. 13 | No. 14 |
|---|---|---|---|---|---|---|---|
| Composition (mol %) | $Na_2O$ | 25 | 29 | 20 | 29 | 20 | 29 |
| | NiO | 50 | 42 | 50 | 42 | 50 | 42 |
| | MnO | | | | | | |
| | $P_2O_5$ | 25 | 29 | 30 | 29 | 30 | 29 |
| Crystalline composition of raw material | | $NaNiPO_4$ Orthorhombic | $Na_4Ni_3(PO_4)_2(P_2O_7)$ Orthorhombic | $Na_4Ni_5(PO_4)_2(P_2O_7)_2$ Monoclinic | $Na_4Ni_3(PO_4)_2(P_2O_7)$ Orthorhombic | $Na_4Ni_5(PO_4)_2(P_2O_7)_2$ Monoclinic | $Na_4Ni_3(PO_4)_2(P_2O_7)$ Orthorhombic |
| Light source | | Yb:$YVO_4$ laser | Yb:$YVO_4$ laser | Yb:$YVO_4$ laser | Yb:$YVO_4$ laser | Yb:$YVO_4$ laser | — |
| Carbon source | | Acetylene black | Acetylene black | Acetylene black | Acetylene black | Acetylene black | Acetylene black |
| Amorphous content (mass %) after laser irradiation | | 89 | 98 | 97 | 98 | 97 | — |
| Heat treatment temperature (° C.) | | — | — | — | 600 | 550 | 600 |
| Amorphous content (mass %) after heat treatment | | — | — | — | 4 | 5 | 0 |
| Discharge capacity (mAh/g) | | 81 | 63 | 65 | 72 | 77 | Non-operating |

(1) Raw Material Preparation $NaH_2PO_4$ and NiO were weighed as raw materials to prepare the compositions shown in Table 3, and respective batches were prepared. Each obtained batch was mixed using a planetary ball mill at 700 rpm for 2 hours. Subsequently, each batch was fired at 800° C., and respective positive electrode active material precursors were produced. The crystal structures of the positive electrode active material precursors were examined by XRD, and the results confirmed that crystals indicated in Table 3 were synthesized. Subsequently, each positive electrode active material precursor was pulverized and classified to obtain a positive electrode active material precursor powder having an average particle size of 2 μm.

In Example Nos. 12 and 13, after laser irradiation, the positive electrode active material was crystallized by being heat treated for 30 minutes in a $N_2$ atmosphere at the temperature described in Table 3. The crystal structures of the positive electrode active materials were examined by XRD, and the results confirmed that the same crystals as those of the positive electrode active material precursor were formed.

Note that in Comparative Example No. 14, instead of laser irradiation, a heat treatment was carried out at 600° C. for 30 minutes in an $N_2$ atmosphere.

(3) Production of Test Battery

A metal aluminum thin film serving as a current collector was formed on the surface of the positive electrode mixture layer by sputtering. Metallic sodium was affixed to a surface of the solid electrolyte layer, the surface being of a side opposite the surface on which the positive electrode mixture layer was formed, and the solid electrolyte layer was then housed in a coin cell, and thereby a CR2032-type coin cell was produced.

(4) Charge/Discharge Test

The obtained test battery was charged in constant current (CC) mode at 80° C. from an open circuit voltage to 5.5 V and then CC discharged from 5.5 V to 2V, and the amount of electricity (initial discharge capacity) discharged from the positive electrode active material per unit mass was determined. The C-rate was set to 0.05 C.

As shown in Table 3, in Example Nos. 9 to 13, the discharge capacities were 63 mAh/g or greater. On the other hand, in Comparative Example No. 14, the battery did not operate.

INDUSTRIAL APPLICABILITY

The positive electrode active material for an alkali ion secondary battery produced according to the present invention is suitable as a constituent material of a secondary battery used as a main power source or the like of, for example, a mobile communication device, a portable electronic device, an electric bicycle, an electric two wheeled vehicle, or an electric vehicle

The invention claimed is:

1. A method for producing a positive electrode active material for an alkali ion secondary battery, the positive electrode active material comprising, in terms of mol %, 34% or more of $CrO+FeO+MnO+CoO+NiO$, and the method comprising:
preparing a positive electrode active material precursor containing crystals; and
irradiating the positive electrode active material precursor with light to melt the crystals and amorphize at least a portion of the positive electrode active material precursor.

2. The method for producing a positive electrode active material for an alkali ion secondary battery according to claim 1, wherein the positive electrode active material for an alkali ion secondary battery comprises, in terms of mol % of the following oxides, from 20 to 55% of $Li_2O+Na_2O$, from 34 to 70% of $CrO+FeO+MnO+CoO+NiO$, and from 5 to 55% of $P_2O_5+SiO_2+B_2O_3$.

3. The method for producing a positive electrode active material for an alkali ion secondary battery according to claim 1, wherein the crystals are maricite-type crystals.

4. The method for producing a positive electrode active material for an alkali ion secondary battery according to claim 1, wherein a peak wavelength of the light is from 0.1 to 30 μm.

5. The method for producing a positive electrode active material for an alkali ion secondary battery according to claim 1, wherein a light source that emits the light is at least one type selected from a near-infrared heater, a far-infrared heater, a halogen lamp, a $CO_2$ laser, a YAG laser, a Yb:$YVO_4$ laser, a laser diode, and a xenon lamp.

6. A method for producing a positive electrode active material for an alkali ion secondary battery, the positive electrode active material comprising, in terms of mol %, 34% or more of $CrO+FeO+MnO+CoO+NiO$, and the method comprising:
preparing a positive electrode active material precursor containing crystals; and
irradiating the positive electrode active material precursor with light to melt the crystals and amorphize at least a portion of the positive electrode active material precursor; wherein
the positive electrode active material for an alkali ion secondary battery further comprises, in terms of mol % of an external division ratio, from 40 to 60% of LiF+NaF.

* * * * *